(12) United States Patent
Lorenz

(10) Patent No.: US 11,459,084 B2
(45) Date of Patent: Oct. 4, 2022

(54) WING FOR AN AIRCRAFT

(71) Applicant: Airbus Operations GmbH, Hamburg (DE)

(72) Inventor: Christian Lorenz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 293 days.

(21) Appl. No.: 16/906,709

(22) Filed: Jun. 19, 2020

(65) Prior Publication Data

US 2020/0398969 A1 Dec. 24, 2020

(30) Foreign Application Priority Data

Jun. 21, 2019 (DE) .......................... 102019116792.2

(51) Int. Cl.
*B64C 3/56* (2006.01)
*B64C 9/34* (2006.01)

(52) U.S. Cl.
CPC .................. *B64C 3/56* (2013.01); *B64C 9/34* (2013.01); *B64C 2201/102* (2013.01)

(58) Field of Classification Search
CPC .. B64C 3/56; B64C 3/546; B64C 9/34; B64C 11/28; B64C 27/50; B64C 2201/102
See application file for complete search history.

(56) References Cited

U.S. PATENT DOCUMENTS

| 2,538,602 | A | 1/1951 | Taylor et al. |
| 10,392,101 | B2 | 8/2019 | Axford et al. |
| 10,501,167 | B2 | 12/2019 | Kracke |
| 2016/0244153 | A1* | 8/2016 | McMahon ............ B64C 23/065 |
| 2016/0264232 | A1* | 9/2016 | Briancourt ............ B64C 23/072 |
| 2017/0137111 | A1 | 5/2017 | Harding et al. |
| 2018/0312251 | A1* | 11/2018 | Petrov ....................... B64C 3/38 |
| 2019/0359312 | A1* | 11/2019 | Lorenz ..................... B64C 3/56 |
| 2020/0269971 | A1* | 8/2020 | Xi .......................... B64C 23/072 |

FOREIGN PATENT DOCUMENTS

| DE | 102016002468 A1 | 8/2017 |
| EP | 3263446 A1 | 1/2018 |
| WO | 2015162399 A1 | 10/2015 |
| WO | WO-2019034432 A1 * | 2/2019 ............. B64C 13/34 |

OTHER PUBLICATIONS

German Office Action; priority document, Pub date Feb. 16, 2020.

* cited by examiner

*Primary Examiner* — Rodney A Bonnette
(74) *Attorney, Agent, or Firm* — Greer, Burns & Crain, Ltd.

(57) ABSTRACT

A wing for an aircraft, comprising a fixed wing, a foldable wing tip portion mounted to the fixed wing via a first hinge rotatably about a first hinge axis between an extended and folded positions, and an actuation unit to actuate the foldable wing tip portion for movement about the first hinge axis. The actuation unit comprises a link, a first and a second linear actuator. The link is rotatably mounted to the fixed wing via a second hinge, the first linear actuator is rotatably mounted to the fixed wing via a third hinge spaced from the second hinge, and is rotatably mounted to the link via a fourth hinge spaced from the second hinge. The second linear actuator is rotatably mounted to the foldable wing tip portion via a fifth hinge, and is rotatably mounted to the link via a sixth hinge spaced from the second hinge.

20 Claims, 4 Drawing Sheets

WING FOR AN AIRCRAFT

CROSS-REFERENCES TO RELATED APPLICATIONS

This application claims the benefit of the German patent application No. 102019116792.2 filed on Jun. 21, 2019, the entire disclosures of which are incorporated herein by way of reference.

FIELD OF THE INVENTION

The present invention relates to a wing for an aircraft, in particular to a foldable wing including a fixed wing and a foldable wing tip portion. A further aspect of the invention relates to an aircraft comprising such a wing.

BACKGROUND OF THE INVENTION

Such a wing comprises a fixed wing for being mounted to a fuselage, and a foldable wing tip portion mounted to the fixed wing via a first hinge or hinges rotatable about a first hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the first hinge axis extends in a horizontal plane and/or in parallel to a chord line and/or in parallel to the wing surface and/or in a flight direction of the aircraft. Alternatively, when the foldable wing tip portion is foldable rearwards, the first hinge axis extends in a vertical direction and/or in a wing thickness direction and/or in a direction transverse or perpendicular to the wing surface.

Further, the wing comprises an actuation unit for actuating the foldable wing tip portion for movement about the first hinge axis relative to the fixed wing, i.e., for movement between the extended and the folded positions. The actuation unit might be powered electrically and/or hydraulically and/or pneumatically.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

Different designs of the actuation unit have been proposed in the art. Generally, the actuation unit should be designed strong enough to reliably move the foldable wing tip portion between the extended and folded positions, but at the same time to have minimum weight and complexity in order to reduce costs of the related aircraft. Additionally, it would be advantageous from both the aerodynamic and the structural point of view if the outer contour or outer skin of the wing would not be penetrated.

SUMMARY OF THE INVENTION

Accordingly, an object of the present invention is to provide a wing having an actuation unit with reduced complexity and weight and that is arranged entirely inside the outer contour of the wing.

This object is achieved in that the actuation unit comprises a link, a first linear actuator and a second linear actuator. The link is rotatably mounted to the fixed wing via a second hinge, preferably at its first end. The first linear actuator, preferably at its first end, is rotatably mounted to the fixed wing via a third hinge spaced apart from the second hinge, and preferably at its opposite second end, is rotatably mounted to the link, preferably to the second end of the link, via a fourth hinge spaced apart from the second hinge. Preferably, the first linear actuator is formed as a hydraulic actuator, a pneumatic actuator, or an electromagnetic linear motor, and is formed such that by actuation of the first linear actuator, the distance between the third hinge and the fourth hinge can be adjusted. The second linear actuator, preferably at its first end, is rotatably mounted to the foldable wing tip portion via a fifth hinge, and preferably at its opposite second end, is rotatably mounted to the link, preferably to the second end of the link, via a sixth hinge spaced apart from the second hinge. Preferably, the second linear actuator is formed as a hydraulic actuator, a pneumatic actuator, or an electromagnetic linear motor, and is formed such that by actuation of the second linear actuator, the distance between the fifth hinge and the sixth hinge can be adjusted.

Such a linkage relates to a particularly efficient kinematics for transferring actuation loads to the foldable wing tip portion and, therefore, allows to downsize the actuation unit, i.e., to reduce its complexity and weight. At the same time, it is possible that the entire linkage and actuation unit remains inside the outer contour or skin of the wing when the foldable wing tip portion is moved between the extended and the folded positions, so that the outer skin does not need to be penetrated by the linkage or actuation unit.

According to a preferred embodiment, the second hinge defines a second hinge axis, the third hinge defines a third hinge axis, the fourth hinge defines a fourth hinge axis, the fifth hinge defines a fifth hinge axis, and the sixth hinge defines a sixth hinge axis. The second hinge axis, the third hinge axis, the fourth hinge axis, the fifth hinge axis, and/or the sixth hinge axis extend in parallel to the first hinge axis. This means, the movement of the actuation unit takes place in the plane defined by the first hinge axis.

According to another preferred embodiment, the second hinge axis coincides with the first hinge axis. This means, when the first and/or second linear actuator is actuated to move the foldable wing tip portion between the folded position and the extended position, the link might rotate about the first hinge axis, just as the foldable wing tip portion does. This relates to a particularly advantageous arrangement of the link for efficient load transfer. However, arrangements where the second hinge axis is spaced apart from the first hinge axis might also be possible and advantageous.

According to yet another preferred embodiment, the link is formed such that the fourth hinge and the sixth hinge are spaced apart from one another and preferably equally spaced apart from the second hinge. In such a way, the link includes three independent hinges and acts as a rigid coupling element between the first and second linear actuators that rotates along a defined path about the second hinge.

In particular, it is preferred that the link has the shape of a Y or a T with the second hinge arranged at the lower end of the Y or T and the fourth and sixth hinges arranged at the two symmetric upper ends of the Y or T. By such a Y or T-shaped link the spaced arrangement of the second, fourth and sixth hinges can be efficiently realized, wherein the distance between the fourth and sixth hinges is preferably smaller as the distance between the fourth hinge and the second hinge or between the sixth hinge and the second hinge, respectively.

According to a further preferred embodiment, the actuation unit is formed such that, in particular the dimensions of the link and the first and second linear actuators as well as the position of the second to sixth hinges are adapted such that, when the foldable wing tip portion is in the folded position, the first linear actuator and the second linear actuator extend relative to one another with an angle of between 70° and 110°, preferably between 80° and 100°, most preferred approximately 90° (+/−5°). In such a way, the first and second linear actuators extend nearly perpendicular from one another in the folded position, which enables a particularly efficient load transfer.

In particular, it is preferred that the link extends relative to the first linear actuator and/or to the second linear actuator with an angle of between 30° and 60°, preferably between 40° and 50°, most preferred approximately 45° (+/−5°). Such an arrangement also enables a very efficient load transfer.

According to a further preferred embodiment, the actuation unit is formed such that, in particular the dimensions of the link and the first and second linear actuators as well as the position of the second to sixth hinges are adapted such that, when the foldable wing tip portion is in the extended position, the first linear actuator and the second linear actuator extend relative to one another with an angle of between 140° and 180°, preferably between 160° and 180°, most preferred approximately 170° (+/−5°). In such a way, the first and second linear actuators extend nearly in parallel to one another in the extended position, which enables a particularly efficient load transfer.

In particular, it is preferred that the link extends relative to the first linear actuator and/or to the second linear actuator with an angle of between 70° and 90°, preferably between 80° and 90°, most preferred approximately 85° (+/−5°). Such an arrangement also enables a very efficient load transfer.

According to a further preferred embodiment, the third hinge is spaced apart from the first hinge axis, and preferably from the second hinge axis, in such a way that the third hinge is positioned further inbound, i.e., in the direction to the fuselage, and preferably further below than the first hinge axis, and preferably the second hinge axis, with respect to a normal position of an associated aircraft on the ground. In such a way, a particularly efficient load transfer is enabled.

According to a further preferred embodiment, the fifth hinge is spaced apart from the first hinge axis, and preferably from the second hinge axis, in such a way that the fifth hinge is positioned further outbound, i.e., further to the tip of the foldable wing tip portion, and preferably further below than the first hinge axis, and preferably the second hinge axis, with respect to a normal position of an associated aircraft on the ground with the foldable wing tip portion in the extended position. In such a way, a particularly efficient load transfer is enabled.

A further aspect of the present invention relates to an aircraft comprising the wing according to any of the embodiments described above. The features and effects described above in connection with the wing apply vis-à-vis to the aircraft.

BRIEF DESCRIPTION OF THE DRAWINGS

Hereinafter, preferred embodiments of the invention are described in more detail by mean of a drawing.

DETAILED DESCRIPTION OF THE PREFERRED EMBODIMENTS

Figure 1:
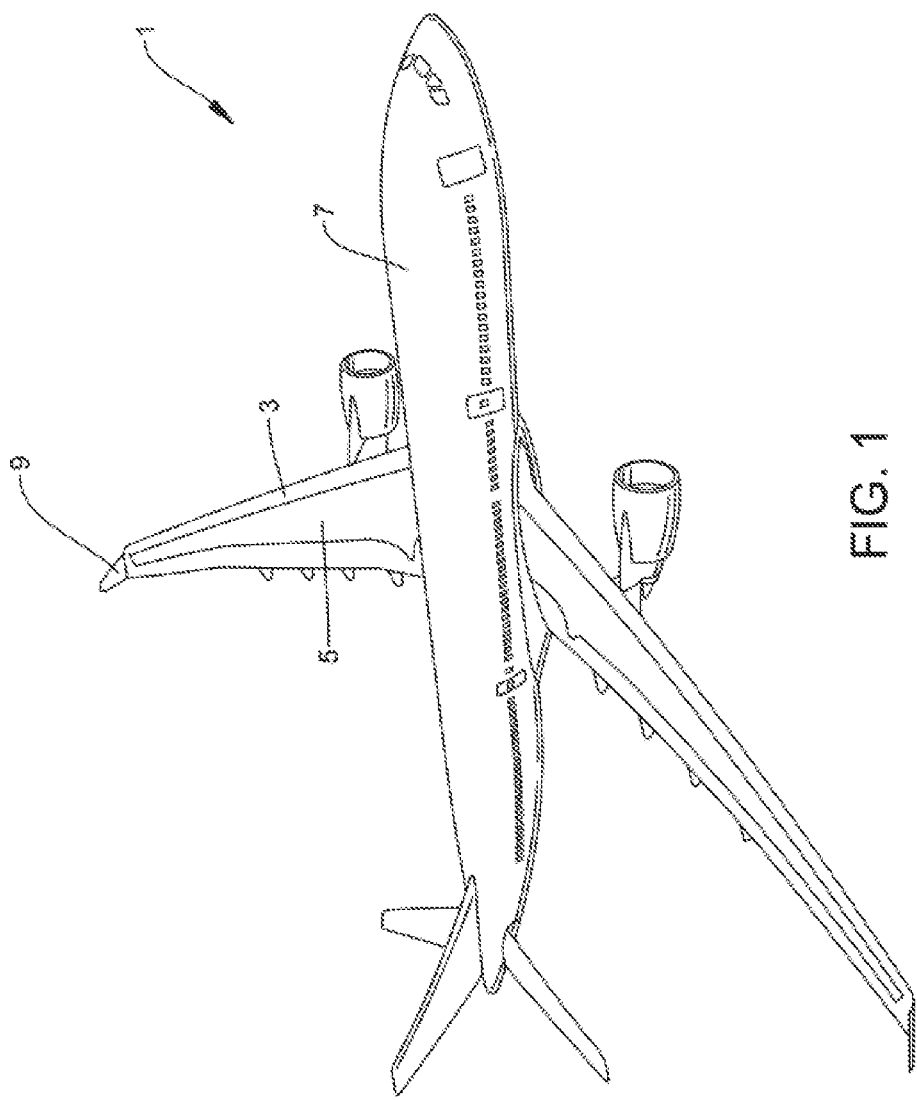
FIG. 1 is a perspective view of an aircraft according to an embodiment of the invention.

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
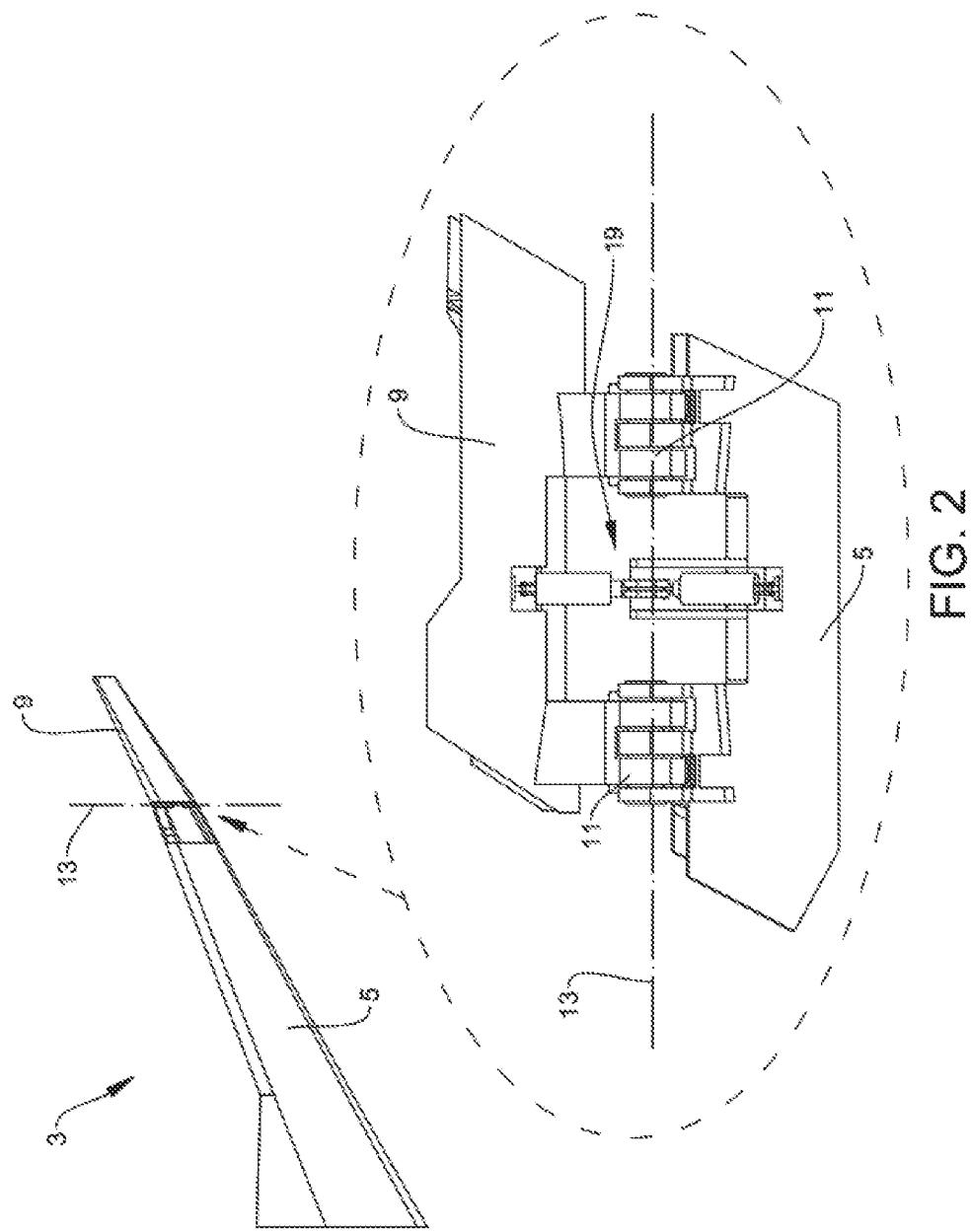
FIG. 2 is a top view of the wing shown in FIG. 1 with a detailed view on the actuation unit.
Figures 3, 4:
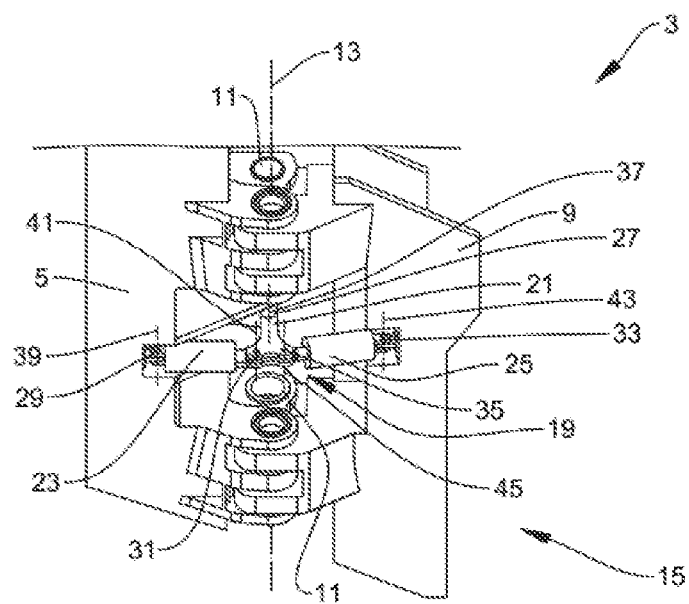
FIG. 3 is a perspective detailed view of the actuation unit shown in FIG. 2 with the foldable wing tip portion in the extended position.
FIG. 4 is the actuation unit as shown in FIG. 3 with the foldable wing tip portion in partly folded position.
Figure 5:
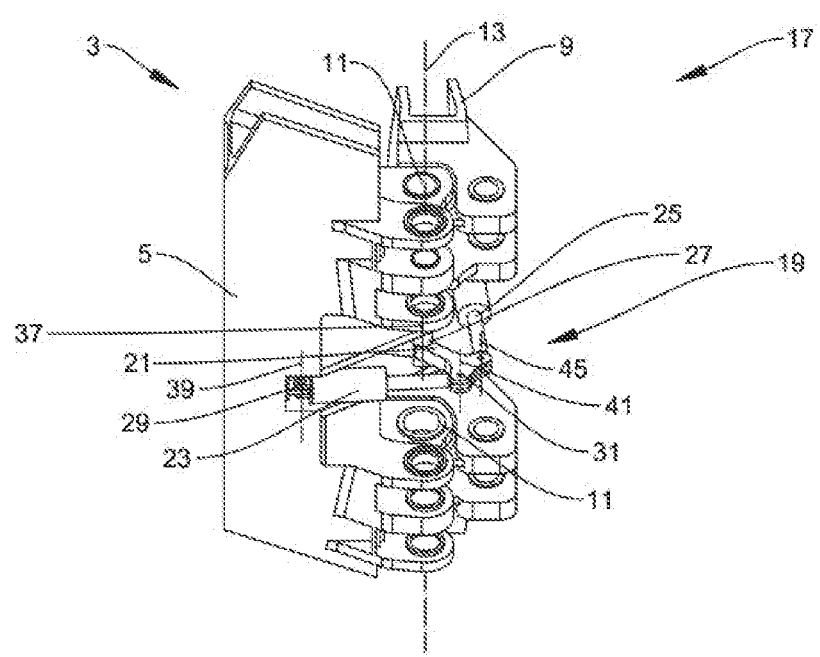
FIG. 5 is the actuation unit as shown in FIG. 3 with the foldable wing tip portion in the upwards folded position.

FIGS. 2 to 5 illustrate the wing 3 of the aircraft 1 shown in FIG. 1 in further detail. As shown in FIG. 2, the foldable wing tip portion 9 is mounted to the fixed wing 5 via first hinges 11 rotatable about a first hinge axis 13 between an extended position 15 (see FIG. 3) and an upwards folded position 17 (see FIG. 5). In the extended position 15 the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1.

Further, the wing 3 comprises an actuation unit 19 for moving the foldable wing tip portion 9 about the hinge axis 13 relative to the fixed wing 5. The actuation unit 19 comprises a link 21, a first linear actuator 23 and a second linear actuator 25. The link 21 at its first end is rotatably mounted to the fixed wing 5 via a second hinge 27. The first linear actuator 23 at its first end is rotatably mounted to the fixed wing 5 via a third hinge 29 spaced apart from the second hinge 27, and at its opposite second end is rotatably mounted to the second end of the link 21 via a fourth hinge 31 spaced apart from the second hinge 27. The first linear actuator 23 is formed as a hydraulic actuator and is formed such that by actuation of the first linear actuator 23 the distance between the third hinge 29 and the fourth hinge 31 can be adjusted. The second linear actuator 25 at its first end is rotatably mounted to the foldable wing tip portion 9 via a fifth hinge 33, and at its opposite second end is rotatably mounted to the second end of the link 21 via a sixth hinge 35 spaced apart from the second hinge 27. The second linear actuator 25 is formed as a hydraulic actuator and is formed such that by actuation of the second linear actuator 25 the distance between the fifth hinge 33 and the sixth hinge 35 can be adjusted.

The second hinge 27 defines a second hinge axis 37, the third hinge 29 defines a third hinge axis 39, the fourth hinge 31 defines a fourth hinge axis 41, the fifth hinge 33 defines a fifth hinge axis 43, and the sixth hinge 35 defines a sixth hinge axis 45. The second hinge axis 37, the third hinge axis 39, the fourth hinge axis 41, the fifth hinge axis 43, and the sixth hinge axis 45 extend in parallel to the first hinge axis 13. Further, the second hinge axis 37 coincides with the first hinge axis 13.

The link 21 is formed such that the fourth hinge 31 and the sixth hinge 35 are spaced apart from one another and equally spaced apart from the second hinge 27. The link 21 has the shape of a Y with the second hinge 27 arranged at the lower end of the Y and the fourth and sixth hinges 31, 35 arranged at the two symmetric upper ends of the Y.

The actuation unit 19 is formed such that, when the foldable wing tip portion 9 is in the folded position 17, the first linear actuator 23 and the second linear actuator 25 extend relative to one another with an angle of approximately 90° (+/−5°). The link 21 extends relative to the first linear actuator 23 and to the second linear actuator 25 with an angle of approximately 45° (+/−5°). Further, the actuation unit 19 is formed such that, when the foldable wing tip portion 9 is in the extended position 15, the first linear actuator 23 and the second linear actuator 25 extend relative to one another with an angle of approximately 170° (+/−5°). The link 21 extends relative to the first linear actuator 23 and to the second linear actuator 25 with an angle of approximately 85° (+/−5°).

The third hinge 29 is spaced apart from the first hinge axis 13 in such a way that the third hinge 29 is positioned further inbound and further below than the first hinge axis 13 with respect to a normal position of the aircraft 1 on the ground. Further, the fifth hinge 33 is spaced apart from the first hinge axis 13 in such a way that the fifth hinge 33 is positioned further outbound and further below than the first hinge axis 13 with respect to a normal position of the aircraft 1 on the ground with the foldable wing tip portion 9 in the extended position 15.

To move the foldable wing tip portion 9 from the extended position 15 to the folded position 17 the first linear actuator 23 and the second linear actuator 25 are extended such that the distance between the third hinge 29 and the fourth hinge 31 as well as the distance between the fifth hinge 33 and the sixth hinge 35 are increased, in the present case equally increased, until the first and second linear actuators 23, 25 extend under an angle of approximately 90° (+/−5°). To move the foldable wing tip portion 9 back to the extended position 15, this process is reversed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a fixed wing,
a foldable wing tip portion mounted to the fixed wing via a first hinge rotatably about a first hinge axis between an extended position and a folded position, and
an actuation unit for actuating the foldable wing tip portion for movement about the first hinge axis,
wherein the actuation unit comprises a link, a first linear actuator and a second linear actuator,
wherein the link is rotatably mounted to the fixed wing via a second hinge,
wherein the first linear actuator is rotatably mounted to the fixed wing via a third hinge spaced apart from the second hinge, and is rotatably mounted to the link via a fourth hinge spaced apart from the second hinge, and
the second linear actuator is rotatably mounted to the foldable wing tip portion via a fifth hinge, and is rotatably mounted to the link via a sixth hinge spaced apart from the second hinge.

2. The wing according to claim 1,
wherein the second hinge defines a second hinge axis, the third hinge defines a third hinge axis, the fourth hinge defines a fourth hinge axis, the fifth hinge defines a fifth hinge axis, the sixth hinge defines a sixth hinge axis, and
wherein the second hinge axis, the third hinge axis, the fourth hinge axis, the fifth hinge axis, and the sixth hinge axis extend in parallel to the first hinge axis.

3. The wing according to claim 1, wherein the second hinge axis coincides with the first hinge axis.

4. The wing according to claim 1, wherein the link is formed such that the fourth hinge and the sixth hinge are spaced apart from one another and are equally spaced apart from the second hinge.

5. The wing according to claim 4, wherein the link is shaped as a Y or a T.

6. The wing according to claim 1, wherein the actuation unit is formed such that, when the foldable wing tip portion is in the folded position, the first linear actuator and the second linear actuator extend relative to one another with an angle of between 70° and 110°.

7. The wing according to claim 6, wherein the link extends relative to at least one of the first linear actuator and the second linear actuator with an angle of between 30° and 60°.

8. The wing according to claim 6, wherein the link extends relative to at least one of the first linear actuator and the second linear actuator with an angle of between 40° and 50°.

9. The wing according to claim 6, wherein the link extends relative to at least one of the first linear actuator and the second linear actuator with an angle of approximately 45°.

10. The wing according to claim 1, wherein the actuation unit is formed such that, when the foldable wing tip portion is in the folded position, the first linear actuator and the second linear actuator extend relative to one another with an angle of, between 80° and 100°.

11. The wing according to claim 1, wherein the actuation unit is formed such that, when the foldable wing tip portion is in the folded position, the first linear actuator and the second linear actuator extend relative to one another with an angle of approximately 90°.

12. The wing according to claim 1, wherein the actuation unit is formed such that, when the foldable wing tip portion is in the extended position, the first linear actuator and the second linear actuator extend relative to one another with an angle of between 140° and 180°.

13. The wing according to claim 12, wherein the link extends relative to at least one of the first linear actuator and the second linear actuator with an angle of between 70° and 90°.

14. The wing according to claim 12, wherein the link extends relative to at least one of the first linear actuator and the second linear actuator with an angle of between 80° and 90°.

15. The wing according to claim 12, wherein the link extends relative to at least one of the first linear actuator and the second linear actuator with an angle of approximately 85°.

16. The wing according to claim 1, wherein the actuation unit is formed such that, when the foldable wing tip portion is in the extended position, the first linear actuator and the second linear actuator extend relative to one another with an angle of between 160° and 180°.

17. The wing according to claim 1, wherein the actuation unit is formed such that, when the foldable wing tip portion is in the extended position, the first linear actuator and the second linear actuator extend relative to one another with an angle of approximately 170°.

18. The wing according to claim 1, wherein the third hinge is spaced apart from the first hinge axis such that the third hinge is positioned further inbound and further below than the first hinge axis.

19. The wing according to claim 1, wherein the fifth hinge is spaced apart from the first hinge axis such that the fifth hinge is positioned further outbound and further below than the first hinge axis.

20. An aircraft comprising the wing according to claim 1.

\* \* \* \* \*